Sept. 2, 1952  F. C. PAYNTER  2,609,229
CAST WHEEL OF ROLLING STOCK
Filed Jan. 7, 1948
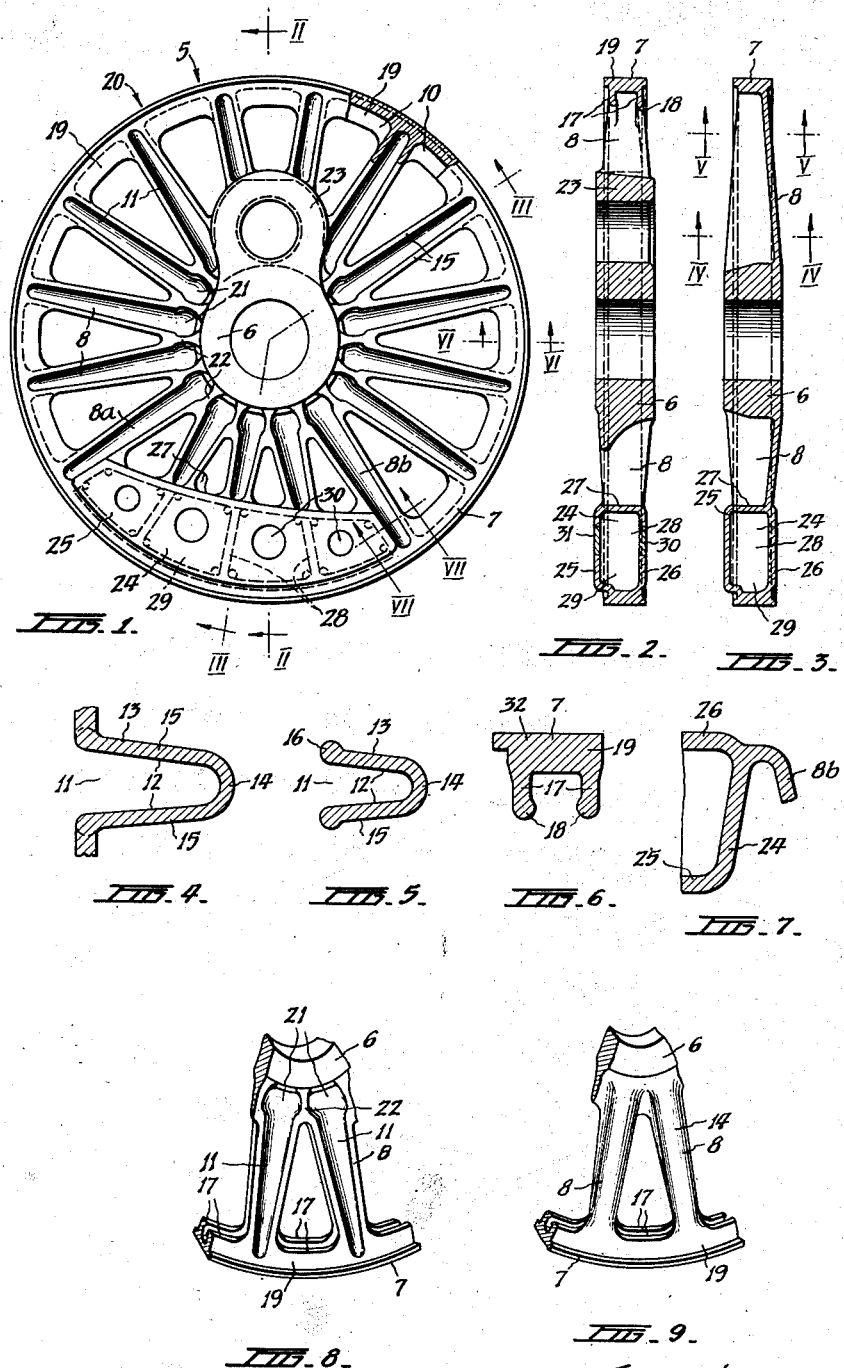
Inventor
F. C. Paynter
By Wenderoth, Lind & Ponack
Attorneys Patented Sept. 2, 1952

2,609,229

UNITED STATES PATENT OFFICE 2,609,229

CAST WHEEL OF ROLLING STOCK

Frederick Charles Paynter, Moonee Ponds, Victoria, Australia, assignor to The Steel Company of Australia Proprietary Limited, Coburg, Victoria, Australia Application January 7, 1948, Serial No. 977
In Australia February 17, 1947

5 Claims. (Cl. 295—6)

This invention relates to cast wheels for railway and tramway rolling stock, of the type having a wheel centre comprised of a hub, spokes, and a rim integrally cast as a unit, and a separate tyre or tread mounted upon and secured to the rim.

It is recognized that cast wheels of this type, particularly those used for the drive wheels of locomotives have many inherent disadvantages in practice, amongst which may be mentioned the lack of durability to withstand the high stresses due to load and heavy driving torque set up during motion.

Fracture of the spokes at the junction with the rim is not uncommon and is due primarily to the differential cooling of the usual solid spokes and rim during the initial casting of the wheel centre.

Segregation and resultant weakening of the metal at the above position may cause the fracture of the weakened part under the driving stresses. Again the load and stress imposed upon the rim of the wheels may cause deflection of the spokes which requires maintenance operations upon the wheel after a relatively short run.

Moreover the wheels as specified are unnecessarily heavy, with the objective of resisting the drive stresses and strains and generally present some difficulty in the foundry to produce a clean sound casting.

Now this invention has for its principal objective the provision of an improved durable and effective cast wheel centre for wheels of the type specified, particularly for the wheels of locomotives, the wheel centre having the desirable characteristic of considerable reduction in weight relative to the cast wheels at present employed without sacrificing the inherent strength to withstand the stresses and strain set up in use or operation.

A further objective of the invention is to provide such a cast spoked wheel centre of a construction that not only facilitates casting operations and the production of clean and sound castings, but eliminates the sections in the wheel centre where segregation or weakening may be set up by differential cooling with possible ultimate fracture of the weakened area.

Another object of the invention is to provide a wheel center of more open construction than those of normal type, whereby access is more conveniently and easily obtained to parts of rolling stock, particularly locomotives, located inwardly of the wheel centre and periodically requiring lubrication and/or adjustment.

The invention will be better understood from the following description of the cast locomotive driving wheel center depicted in the accompanying drawings wherein:

Fig. 1 is a side elevation partly in section of a cast locomotive driving wheel centre.

Figs. 2 and 3 are sections on the lines II—II and III—III of Fig. 1.

Figs. 4 and 5 are transverse sections of a wheel spoke on the lines IV—IV and V—V of Fig. 3.

Fig. 6 is a transverse section on the line VI—VI of the rim of the wheel centre shown by Fig. 1.

Fig. 7 is a sectional detail on the line VII—VII of Fig. 1.

Figs. 8 and 9 are fragmentary details of the wheel shown by Fig. 1.

Referring to these drawings in more detail the numeral 5 designates, generally, the wheel center having a central hub or boss 6 appropriately bored to receive an axle (not shown), a rim 7 and spokes 8 radiating from the hub 6 and terminating in the rim 7.

The wheel centre comprised of the hub 6, rim 7, and spokes 8, is cast as an integral unit of steel of required specification.

The spokes 8 are of channel or U-shape section and the space within each spoke 8 comprises a longitudinal recess, indicated by 11, the inner face 12 of the spoke being substantially parallel with the outer face 13 thereof.

The base or portion 14 connecting the sides or flanges 15 of the spoke is of radiused or rounded formation, and said sides or flanges are relatively inclined to each other from the base 14 to the outer edges which are radiused or beaded as at 16, see Figs. 4 and 5.

The spokes 8 taper uniformly and convergently from the hub 6 to the rim 7, both at the sides 15 and at the bases 14 and beaded edges 16.

Formed integrally with the rim 7 and the spokes 8 are webs or flange portions 17 which project inwardly from the rim in parallel relation, see Figs. 2, 6, 8 and 9.

The edges of the integral webs 17 are radiused or beaded as at 18, and the two parallel webs and the portion of the rim integral with said webs and extending between adjoining spokes comprises a channel section 19 of substantially uniform section and great strength which may be formed by casting without difficulty.

At the inner ends of the spokes 8, the recesses 11 are somewhat enlarged as at 21 and are separated by web portions 22 radial to the hub 6.

The hub 6 is extended at 23, and bored parallel with and at a required radial distance from the axis of the wheel center to receive a crank pin (not shown).

In order to provide a balance weight, there is formed an integral boxed part 24 which is disposed within the rim 7 and is provided with spaced walls 25 and 26 and a wall 27 disposed in chordal arrangement. The boxed part comprising the balance weight extends between two spokes indicated by 8a—8b, and webs 28 extending in radial arrangement through the boxed part 24 form continuations of the spokes positioned between the spokes 8a and 8b.

The webs 28 separate the boxed balance weight 24 into cells indicated by 29, and apertures 30 formed in the walls 25 and 26 by the stems or supports of the cores used in the process of casting may be closed by plugging as at 31.

A flanged tire or tread (not shown) is shrunk upon and secured to the periphery of the wheel center above described to complete a driving wheel for a locomotive in accordance with customary practice.

Each spoke 8 by virtue of its channel cross section has the requisite strength while being relieved of superfluous metal and resultantly reduced in weight, and the rim 7 being channelled or recessed between the spokes is also materially strengthened, the solid section or base 32 of the channel sections 19 providing the requisite strength to resist driving stresses.

In the locomotive wheel center, above described, the rim sections 19 are of channel section with radiused corners or fillets, but, according to size or requirements, the channel between the flanges 17 may comprise a continuous curve so as to have a U-shaped section.

Incidentally, the enlargements 21 of the recesses 11 extending into the hub, and the channelling of the rim, eliminate the thickened or enlarged areas that normally occur at the junctions of the spokes with the hub and rim, thus eliminating the formation of weakened portions in the castings in cooling.

Furthermore, the construction facilitates the casting of the wheels without imperfections.

I claim:

1. An integrally cast locomotive wheel center comprising a channel rim having a circumferential web portion and inwardly extended flanges, an axle hub, a crank pin hub, spokes convergently tapering from said hubs to the rim and merging into the edges and sides of the flanges and into the circumferential rim portion, longitudinal tapering recesses in said spokes, enlargements of said recesses adjoining the axle hub, radial webs separating the enlargements, a box section counterbalance casing opposed to the crank pin hub and extending inwardly from the channel rim, lateral walls at the opposite sides of the counterbalance casing, a portion of the channel rim comprising the outer wall of said casing, a substantially chordal wall comprising the inner side of said casing, shortened recessed tapering spokes extending from the axle hub to the counterbalance casing and united with the substantially chordal wall, and transverse webs in the counterbalance casing located in alignment with and comprising extensions of the shortened recessed tapering spokes.

2. An integrally cast locomotive wheel center comprising a channel rim having a circumferential web portion and inwardly extended lateral flanges, an axle hub, a crank pin hub, separate radial spokes convergently tapering from said hubs to the rim and merging into the inwardly extended lateral flanges and the circumferential web portion, a counterweight casing in balanced relation to the crank pin hub extending inwardly from the rim and between a spacedly related pair of the tapering radial spokes, shorter radial spokes intermediate said spacedly related pair of spokes and convergently tapering from the axle hub to the counterweight casing, transverse partitions in the counterweight casing disposed in alignment with the shorter radial spokes, longitudinal tapering recesses in said spokes, and enlargements of the longitudinal recesses at the ends of said spokes merging into the axle hub.

3. An integrally cast locomotive wheel center comprising a channel rim having a cylindrical web portion to receive a tire and inwardly extended flanges on opposite sides of the cylindrical web portion, an axle hub, a crank hub, separate channelled spokes tapering convergently from said hubs and merging into the inwardly extended flanges and the cylindrical web, a counterweight casing in balanced relation to the crank pin hub extending inwardly from the channel rim and disposed between a spacedly related pair of the separate channelled tapering spokes, enlargements on the inwardly extended rim flanges forming lateral walls of the counterweight casing, an arcuate part of the rim web portion forming the outer wall of the counterweight casing, a transversely disposed chordal member extending between the pair of spacedly related spokes forming the inner wall of the casing, separate short channelled spokes tapering convergently from the axle hub to the chordal member, and transverse webs within the counterweight casing disposed in radial alignment with the separate short channelled spokes and dividing the counterweight casing into compartments.

4. An integrally cast locomotive wheel center comprising a rim of channel section, a circumferential rim part formed cylindrically to receive a tire and comprising the web of the channel section rim, lateral rim parts extending inwardly from and on opposite sides of the circumferential rim part and comprising the flanges of the channel section rim, an axle hub, a crank pin hub, separate radial spokes of U-section convergently tapering from said hubs to the rim, a counterweight casing in balanced relation to the crank pin hub extending inwardly from the rim and between a spacedly related pair of the separate radial spokes, lateral walls at opposite sides of the counterweight casing in continuity with the flanges of the channel section rim, a chordal wall extending between the spacedly related pair of radial spokes and comprising the inner side of the casing, an arcuate portion of the web of the channel section rim extending between the spacedly related pair of spokes and comprising the outer wall of said casing, separate short spokes of U-section tapering convergently from the axle hub to the chordal wall, and partitioning webs dividing the counterweight casing into separate cells and disposed in radial alignment with the separate short U-section spokes.

5. An integrally cast locomotive wheel center, comprising a channel rim having a circumferential web portion and inwardly extended flanges, an axle hub, a crank pin hub, spokes convergently tapering from said hubs to the rim and merging into the edges and sides of the flanges and into the circumferential web portion, a fluted recess extending longitudinally in and tapered in conformity with each spoke, an enlarged cavity continuous with the fluted recess at the inner terminal end of each spoke with the axle hub, and ribs radiating from the axle hub and separating the enlarged cavities.

FREDERICK CHARLES PAYNTER.

REFERENCES CITED

The following references are of record in the file of this patent:

UNITED STATES PATENTS

| Number | Name | Date |
|---|---|---|
| 506,850 | Hailes | Oct. 17, 1893 |
| 521,587 | Hirt | June 18, 1894 |
| 1,054,992 | Shore | Mar. 4, 1913 |
| 1,952,489 | Blunt | Mar. 27, 1934 |
| 1,960,039 | Wintemberg | May 22, 1934 |
| 2,049,908 | Johnson | Aug. 4, 1936 |

FOREIGN PATENTS

| Number | Country | Date |
|---|---|---|
| 100,376 | Great Britain | 1916 |